United States Patent [19]

Yamada et al.

[11] 3,997,254
[45] Dec. 14, 1976

[54] FILM FEED APPARATUS

[75] Inventors: Yasutsugu Yamada, Kawasaki; Katuhiko Toda, Kanagawa, both of Japan

[73] Assignee: Canon Kabushiki Kaisha, Tokyo, Japan

[22] Filed: Aug. 23, 1973

[21] Appl. No.: 390,708

[30] Foreign Application Priority Data

Aug. 25, 1972  Japan .............................. 47-85063

[52] U.S. Cl. ................................ 352/194; 74/605
[51] Int. Cl.² ......................................... G03B 1/22
[58] Field of Search .......... 352/166, 191, 194, 195, 352/196, 84; 74/605

[56] References Cited

UNITED STATES PATENTS

| | | | |
|---|---|---|---|
| 767,877 | 8/1904 | Fleming | 74/605 |
| 1,378,910 | 5/1921 | Smith | 74/605 |
| 1,590,493 | 6/1926 | Bohmker | 74/605 |
| 3,454,334 | 7/1969 | Campbell | 352/191 |
| 3,556,648 | 1/1971 | Nozawa | 352/194 |

*Primary Examiner*—Monroe H. Hayes
*Attorney, Agent, or Firm*—Toren, McGeady and Stanger

[57] ABSTRACT

A lubrication unit is provided for lubricating drive and driven members used in a film apparatus which continuously feeds a film in a small size motion picture camera, a motion picture projector, a still camera incorporating a motor drive or the like. The unit includes lubrication means for lubricating engaging parts of a drive member that is rotatively driven and a driven member which is held in engagement with the drive member when the drive member is driven at a high speed. The lubrication means includes a lubricant storage in either a drive member or driven member, the lubricant storage communicating with the engaging surfaces of the drive and driven members to supply a controlled amount of lubricant thereto under the influence of the centrifugal force that is developed upon rotation of either drive or driven member.

4 Claims, 14 Drawing Figures

FILM FEED APPARATUS

BACKGROUND OF THE INVENTION

Field of the Invention

The invention relates to a lubrication unit for lubricating drive and driven members used in a film feed apparatus which continuously feeds a film in a small size motion picture camera, a motion picture projector, a still camera incorporating a motor drive or the like.

The drive and driven members used in a film feed apparatus for continuously feeding a film in a small size motion picture camera, a motion picture projector, a still camera incorporating a motor drive or the like comprise cam, gear, rotary shaft and the like. The cam may be an eccentric cam, a triangular cam or the like which is driven for rotation and provides a lift which is utilized to operate a film feed pawl member which intermittently feeds a strip such as a film or the like. Because the space involved with the cam and the feed pawl is extremely limited and because the cam is subject to an eccentric rotating motion, it is very difficult, if not impossible, to mount an external lubrication unit adjacent to such location. In addition, these members represent an area which is subject to an intermittent load of very high magnitude during the film feeding operation and which is of greatest importance in maintaining the stability of a photographed or projected picture.

The prior art method to provide lubrication to these parts include (1) provision of an oil impregnated felt in sliding contact with the cam, (2) formation of the eccentric cam from an oil impregnated alloy, (3) formation of the cam by molding, (4) use of bearing lubrication method, or the like, none of which provide a satisfactory lubrication as will be discussed below particularly when the cam is subjected to a high speed rotation.

Dealing with the prior art methods more specifically, the first method provides an oil impregnated felt adjacent to the eccentric cam so that lubrication to the sliding surface of the cam is supplied once during every rotation of the cam, but requires a space for the provision of the oil impregnated felt, which it is difficult to supply in the limited space as mentioned above. In addition, it suffers from the disadvantage that the required construction is complex. The second method uses an eccentric cam made of an oil impregnated alloy and does not require an external lubrication means, but the hardness of the oil impregnated alloy is limited, which prevents the manufacturing of the cam from a material having a high hardness, thus rendering it prone to abrasion to cause a gradual decrease in the accuracy of its engagement with the driven member, thereby losing the stability in the film feeding operation. In addition, a high accuracy is difficult to achieve when machining the cam. The third method involves the use of a molded cam, which avoids the need for lubrication as used with a metal cam, but such molded cam is susceptible to deformation under high loads, and does not provide sufficient accuracy in view of its hardness. The fourth method applies an oil of the kind such as grease to the cam surface previously, so that heating and abrasion can be prevented until the grease is lost. Because it is impossible to provide an initial supply of a large amount of grease applied thereto, the cam will progressively experience shortage of lubricant and undergo the resulting seizure of the sliding parts, thus resulting in the decrease of the accuracy of engagement because of abrasion and breakage and causing instability in the film feeding operation. This could be avoided by increasing the contact surface of the cam, which requires a large space and is difficult to provide because of the limited machining accuracy.

The above-mentioned lubrication methods afforded certain achievements at a drive speed of the prior art motion picture camera or motion picture projector (for example, on the order of 8 to 36 frames per second in a motion picture camera), but recently a further increase in the speed has been demanded as a result of diversification of products and explored marketability, and it has become necessary to provide a photographing speed of 72 frames per second or higher in a small size motion picture camera. In these circumstances, the prior art lubrication methods presented problems in view of the adverse influence caused by the seizure of the cam surface, abrasion, and scattering of grease.

Also with gear or rotary shaft, the space provided for these members is extremely limited and because the gear has a concave and convex configuration on it outer periphery while the rotary shaft has very close clearance between it and its bearing, it is very difficult to provide an external lubrication unit adjacent to such parts. In addition, these members are subject to a high torque during the drive, and if they are not properly lubricated, abnormal clicks will occur and regular rotation from the drive will not be obtained, thereby adversely influencing the photographed or projected picture. The lubrication technique and unit as used with the cam mentioned above have been also applied to provide the lubrication of these parts, but the result cannot be said to be satisfactory.

SUMMARY OF THE INVENTION

The invention is directed to eliminating the prior art disadvantages described above.

Therefore, it is a first object of the invention to provide a lubrication unit which, without recourse to an external lubrication unit, provides lubrication of the master and slave members used in a film feed apparatus which continuously feeds a film in a small size motion picture camera, motion picture projector, still camera incorporating a motor drive or the like.

It is a second object of the invention to provide a lubrication unit for all of the master and slave members of the film feed apparatus without increasing the number of parts as compared when it is not provided with such a lubrication unit.

It is a third object of the invention to provide a lubrication unit for all of the master and slave members without inducing scattering of the lubricant, used for the lubrication of these members, to other members.

In accordance with the invention, a lubricant storage is provided in either a drive member or a driven member rather than using an external lubricant supply, and the storaged is filled with a lubricant having a relatively high viscosity, such as grease or the like. The storage is associated with guide means which permit the lubricant to readily lead therethrough to the sliding surfaces of the drive and driven members under the influence of the centrifugal force which is developed upon rotation of the drive or driven member. The amount of the lubricant supplied is controllable depending upon the rotating speed of the drive member. The lubrication of the sliding contact surfaces of the drive and driven members is achieved by utilizing the softening of the lubricant by the frictional heating produced under the intermittent load and the centrifugal force of the rotating body, thereby preventing seizure, excessive lubrication than is necessary and the scattering of the grease.

DETAILED DESCRIPTION OF EMBODIMENTS

Figure 1:
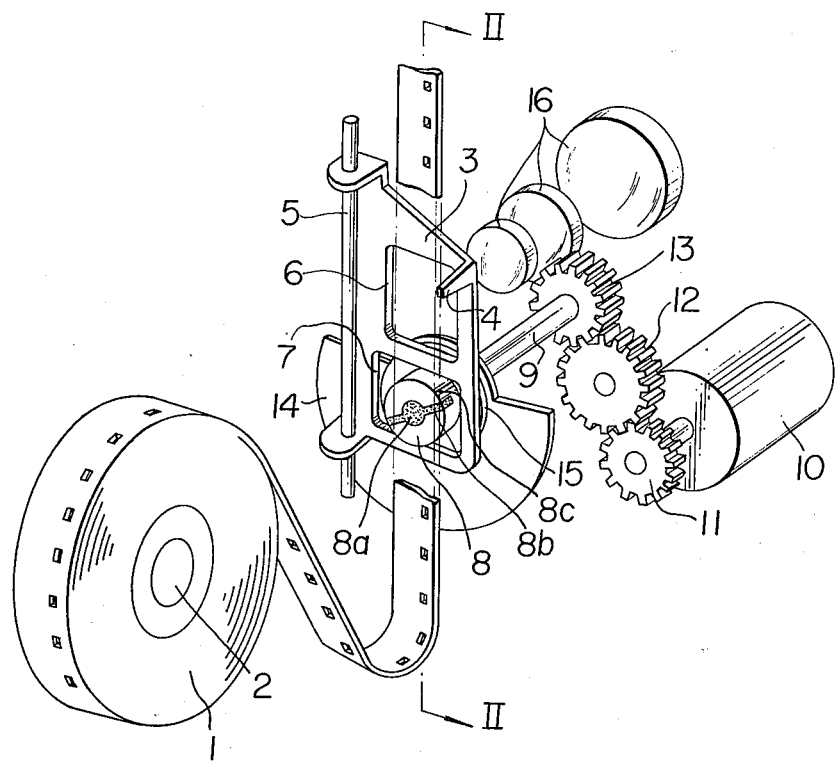
FIG. 1 is a perspective view of a lubrication unit for lubricating drive or driven members used for the continuous feed of a film according to the invention, as applied to a small size motion picture camera.
Figure 2:
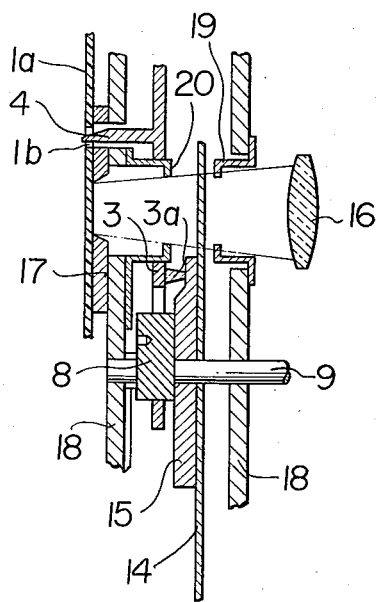
FIG. 2 is a section taken along the line II—II shown in FIG. 1 and viewed in the direction of arrows.

Referring to FIGS. 1 and 2, a roll film 1 is wound on a winding shaft 2, and a slide member 3 carrying a film feel pawl 4 is adapted to slide vertically, as viewed in these Figures, along a guide member 5. The slide member 3 is formed with an aperture 6 for admitting light passed to an optical system 16 which is provided for the purpose of taking pictures, and also with an opening 7 which is in sliding contact with a rotary cam 8 that is in turn eccentrically mounted on a rotary shaft 9. The driving force from a drive motor 10 is transmitted through a gear 11 mounted on the motor shaft, an intermediate gear 12 to a gear 13 on the rotary shaft. A rotary shutter 14 is mounted on the rotary shaft, while a face cam 15 is mounted on the shaft in concentric relationship with the shutter, the face cam being urged to be normally in contact with the slide member 3 through a pin 3a (see FIG. 2). FIG. 2 shows further detail of the film feed mechanism in cross section. Referring to this Figure, a base plate 18 rotatably carries the rotary shaft 9 and also carries a film gate 17. The parts are shown in this Figure in their positions in which a perforation 16 in the film 1a positioned within the aperture is engaged with the feed pawl 4. Numerals 19 and 20 represent light shields mounted on the base plate 18.

The eccentric cam 8 which is eccentrically mounted on the rotary shaft 9 is engaged with the opening 7 formed in the slide member 3, and is formed with a storage 8a in which is filled a lubricant having a high viscosity, such as grease, and also with a guide groove 8b which provides communication between the storage and the sliding contact surface 8c of the cam so as to permit the lubricant to reach the cam surface by leakage therethrough.

In operation, the output from the film feed motor 10 is transmitted through the group of gears 11, 12 and 13 and through the rotary shaft 9 to the eccentric cam 8, which rotates together with the rotary shutter 14 and the face cam 15. The slide member engaging with the eccentric cam 8 is driven for vertical reciprocation of the film feed pawl 4, but the forward edge of the feed pawl 4 engages the perforation 1b in the film 1a only when the pawl moves downwardly (FIG. 2). The load which occurs at this time is locally concentrated in the contacting surfaces of the eccentric cam 8 and the slide member 3 which carries the film feed pawl 4. When such motion is continued, heat is produced by friction, whereby the eccentric cam 8 and the slide member 3 becomes heated. Because the eccentric cam 8 is formed with the storage 8a containing a lubricant such as grease or the like having a high viscosity and is also formed with the guide groove 8b which extends to the locus of contact between the eccentric cam and the slide member 3, the lubricant contained within the storage is softened and ready to flow as a result of heat produced by the friction between the cam and slide member, and the softened lubricant will leak through the guide groove to the contact surfaces under the influence of the centrifugal force developed by the rotation of the eccentric cam itself. Such leakage will occur in a very small quantity only when the eccentric cam rotates, and its quantity depends on the heat of friction as well as the eccentric force, thus increasing as the rotational speed of the cam is increased.

The construction of the eccentric cam as well as factors which should be taken into consideration in determining the relationship between such construction and the flow or supply of the lubricant will be more fully described below.

Figures 3A, 3B, 3C:
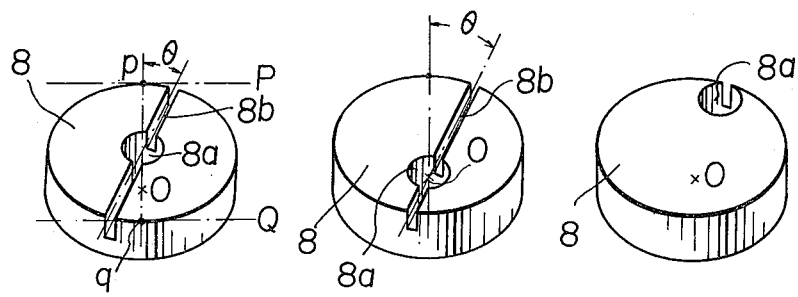
FIGS. 3(A) to (F) are perspective views illustrating modified forms of the eccentric cam shown in FIG. 1.

Dealing with the construction of the eccentric cam initially, FIG. 3(A) shows the eccentric cam shown in FIG. 1 to an enlarged scale. When the center of rotation is located at 0, preferably the storage 8a and the guide groove 8b are positioned as shown. Specifically, denoting the angle formed between the guide groove 8b and the line segment joining the point of maximum eccentricity $p$ and the point of minimum eccentricity $q$, by $\theta$, the arrangement should be such that $\theta \neq 0°$. This is because when the point of maximum eccentricity $p$ and the point of minimum eccentricity $q$, or in actuality, the generatrix of the peripheral cam surface including these points $p$ and $q$ contact the slide member, the film feed pawl 4 is located in its top or bottom dead center of its reciprocatory stroke, respectively, for engagement with or disengagement from the film 1a to thereby subject the eccentric cam 8 and the slide member 3 to a high load at this time, so that if the guide groove is positioned to contact the slide member at this time, the edge of the groove will be readily abraded, thereby influencing the stability of the engagement and disengagement with the film. On the other hand, if this angle $\theta$ is increased, the edge of the groove located nearer the point $p$ will be positioned nearer the center of rotation 0, thereby decreasing the effect of the centrifugal force. Thus, it is preferred that the angle $\theta$ be minimized in order to increase the supply of lubricant from the storage to the cam surface.

Another method to control the amount of lubricant supply by a construction similar to that shown in FIG. 3(A) is to adjust the distance between the center of rotation 0 of the eccentric cam 8 and the lubricant storage 8a when the cam rotates at a constant speed. It will be readily understood that the amount of supplied lubricant increases as such distance is increased because of the resulting increased centrifugal force. Thus, when the storage 8a is located coincident with the center of rotation 0 as shown in FIG. 3(B), the amount of lubricant supplied can be minimized, while when such distance is maximized as shown in FIG. 3(C), the amount of lubricant supplied will be at maximum. A suitable construction can be chosen from these examples shown depending upon the nature of the lubricant used and the number of revolutions employed. For example, a cam as shown in FIG. 3(B) may be used when a lubricant having a medium viscosity is employed to provide an automatic supply in very small quantities. In addition, the storage 8a may be filled with a body of felt or the like which is impregnated with the lubricant.

Figures 3D, 3E, 3F:
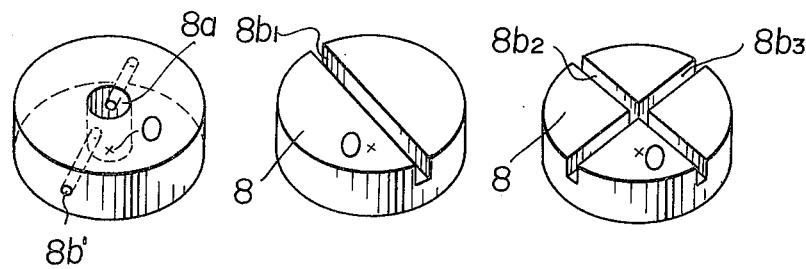

FIG. 3(D) shows another example in which the communication between the storage 8a and the cam surface is provided by a guide hole 8b rather than by a split guide groove 8b. FIGS. 3(E) and (F) show other examples in which the storage 8a is omitted and only a single or a plurality of guide grooves are formed which are filled with a lubricant having a high viscosity.

A third method of controlling the flow of lubricant is to adjust the capacity of the storage, guide groove or guide hole in the eccentric cam of various examples shown.

Even if the configuration is definite, the peripheral speed of the cam surface will increase as the number of revolutions of the eccentric cam increases, so that the viscous lubricant will be more readily softened by the frictional heat generated and also the centrifugal force will increase, thereby increasing the amount of lubricant supplied to the cam surface. This means that seizure accompanying a high speed operation can automatically be prevented.

While a viscous lubricant such as grease is preferred, a lubricant having a relatively low viscosity can be used by impregnating a felt or the like with it and locating it within the storage.

It will be understood that the choice of the lubricant and the configuration of the cam used is made such that the supply of the lubricant to the cam surface takes place in a very small amount. To prevent the influence of an excessive amount of lubricant reaching the cam surface, in particular, its scattering around the film, lens or the like, the shields 19 and 20 as shown in FIG. 2 are provided to protect the lens, and the film. These shields may be modified to serve as a light shield. It should be understood that other considerations including increasing the spacing between the lens and the cam are taken into the design.

Figure 4:
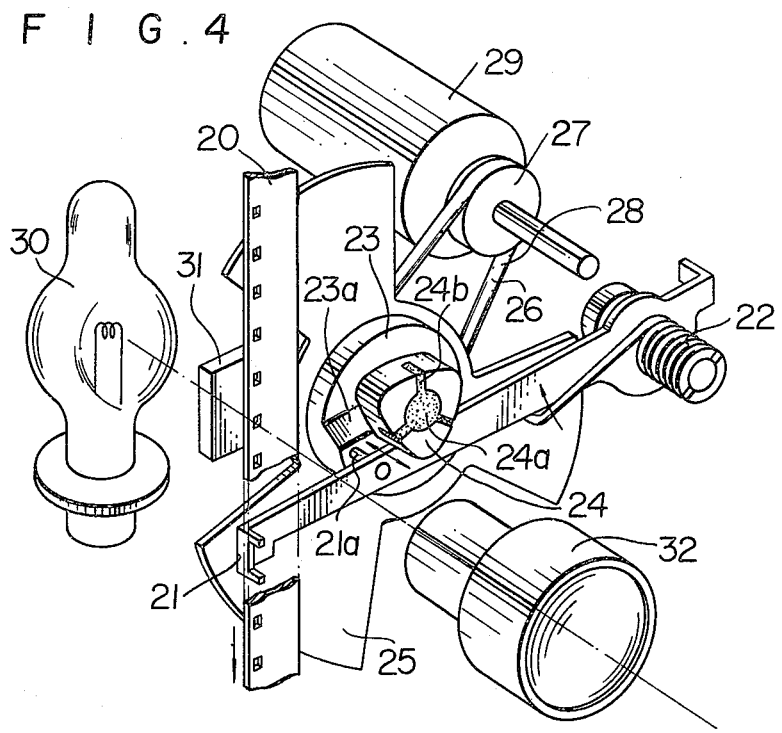
FIG. 4 is a perspective view illustrating another embodiment of the lubrication unit according to the invention as applied to a motion picture projector.

FIG. 4 shows one embodiment of the unit according to the invention as applied to the film feed mechanism of a motion picture projector. A motion picture film is shown at 20 and includes perforations which can be engaged by a feed pawl 12. A spring 22 urges the feed pawl into forced contact with a face cam 23 and a triangular cam 24. Shutter blades are shown at 25, and a belt 26 running around a pulley 27 mounted on a motor shaft 28 serves the transmission of the driving force from a drive motor 29 to a shutter shaft, not shown. The projector also includes a lamp 30, heat shield glass 31 and a projector lens 32. The feed pawl 21 is carried by a lever on which is mounted a pin 21a which is adapted to cooperate with the bevel 23a on the face cam 23 to move the feed pawl 21 into and away from the perforation in the film during the rotation of the shutter shaft. The feed pawl 21 also undergoes a reciprocatory motion for feeding the film in accordance with the configuration of the peripheral cam surface of the triangular cam 24. As in the eccentric cam described above, the triangular cam 24 is formed with a lubricant storage 24a and guide grooves 24b which provide communication between the storage and the peripheral surface. Thus, the lubricating action provided by this triangular cam is quite similar to that provided by the above-described eccentric cam. The triangular cam imparts an intermittent feed operation to the film feed pawl 21 in accordance with the active cam surface during the operation of the drive motor 29, and also prevents seizure which might occur in the mutually sliding portions as a result of the frictional heat, by causing the lubricant to leak through the guide groove 24b to the cam surface as the lubricant filled within the storage 24a becomes softened. The guide grooves 24b are formed at positions which are offset from those portions of the cam which provide a maximum lift. It will be understood that the storage 24a and guide grooves 24b in the triangular cam can be modified as shown in FIG. 3, thereby controlling the amount of lubricant supplied. Similar means as mentioned above may be used to prevent scattering of the lubricant.

Figure 5:
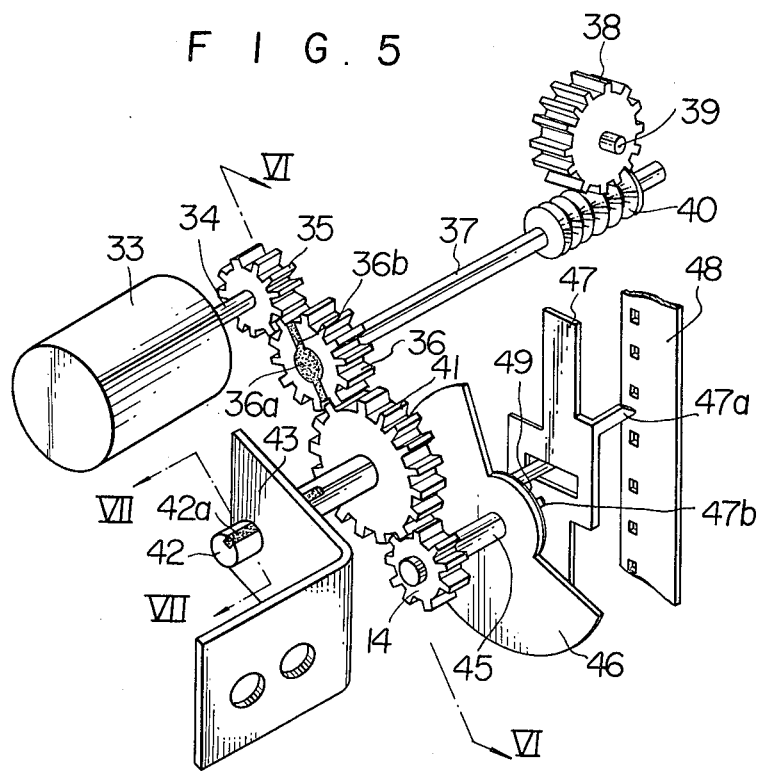
FIG. 5 is a perspective view illustrating a further embodiment of the lubrication unit according to the invention as applied to a small size motion picture camera.
Figure 6:
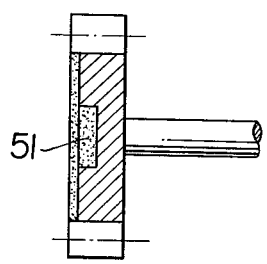
FIG. 6 is a cross section of the gear shown in FIG. 5 as taken along the line X—X and viewed in the direction of arrows.
Figure 7:
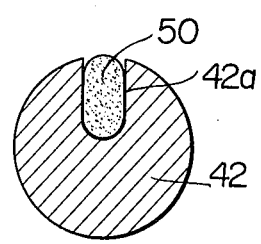
FIG. 7 is a cross section of the shaft 42 shown in FIG. 5 as taken along the line Y—Y and viewed in the direction of arrows.

FIG. 5 shows another embodiment of the unit according to the invention as applied to the film feed mechanism of a motion picture camera. A slide member 47 carries a film feed pawl 47a and a contact member 47b for cooperation with an eccentric cam, not shown, mounted on a shaft 49 for feeding a film 48. A shutter blade is shown at 46 and is mounted on a rotary shaft 45 carrying a spur gear 14 at its other end. The drive for the film feed apparatus is derived from a motor 33 having a motor shaft 34 on which is fitted a spur gear 35, which in turn meshes with a spur gear 36 mounted on a shaft 37, on the other end of which is mounted a worm gear 40 meshing with a worm wheel 38 that is journalled on a shaft 39 and imparts a drive to a film winding shaft, not shown. As shown in FIG. 6, the spur gear 36 is formed with a storage 36a for storing lubricant 51 such as grease having a relatively high viscosity, and with guide grooves 36b which are located at positions permitting a simultaneous meshing between the spur gear 36 and the gears 35, 41. The gear 41 is journalled on a shaft 42 and transmits the driving force from the gear 36 to the gear 14 for driving the film feed apparatus. The shaft 42 is rotatably journalled in a bearing member 43, and is formed with a storage 42a in which lubricant 50 such as grease having a high viscosity is filled, as shown in FIG. 7.

As the gear 36 is driven for rotation, the frictional heat produced by the meshing between the gear 36 and the gears 35, 41 decreases the viscosity of the lubricant 51, which is applied to the gears 35, 41 under the influence of the centrifugal force. Simultaneously, when the shaft 42 is driven for rotation, the heat produced by the sliding friction with the bearing 43 decreases the viscosity of the lubricant 50, which is then applied to the bearing surface in contact with the shaft 42 under the influence of the centrifugal force.

Figure 8:
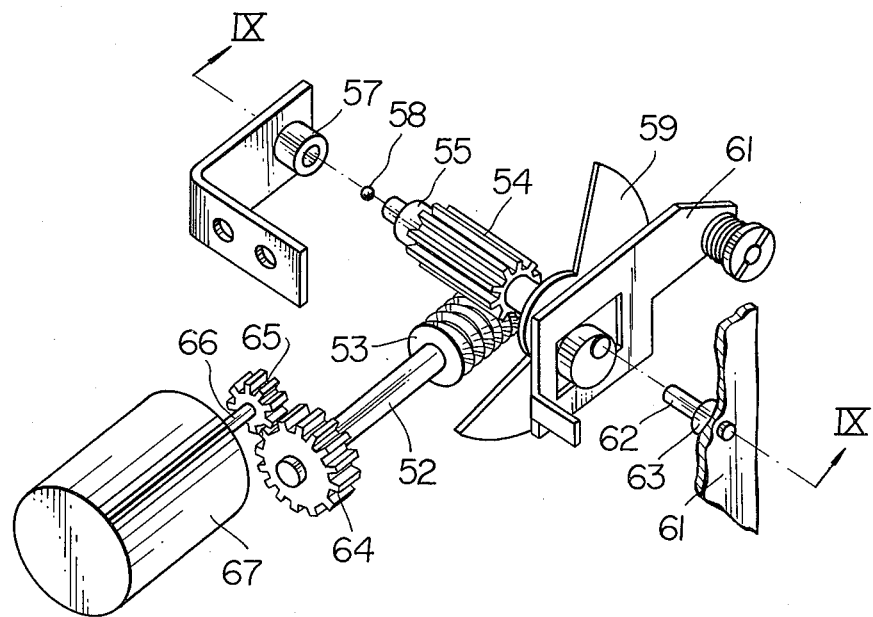
FIG. 8 is a perspective view illustrating still another embodiment of the lubrication unit according to the invention applied to a small size motion picture camera.
Figure 9:
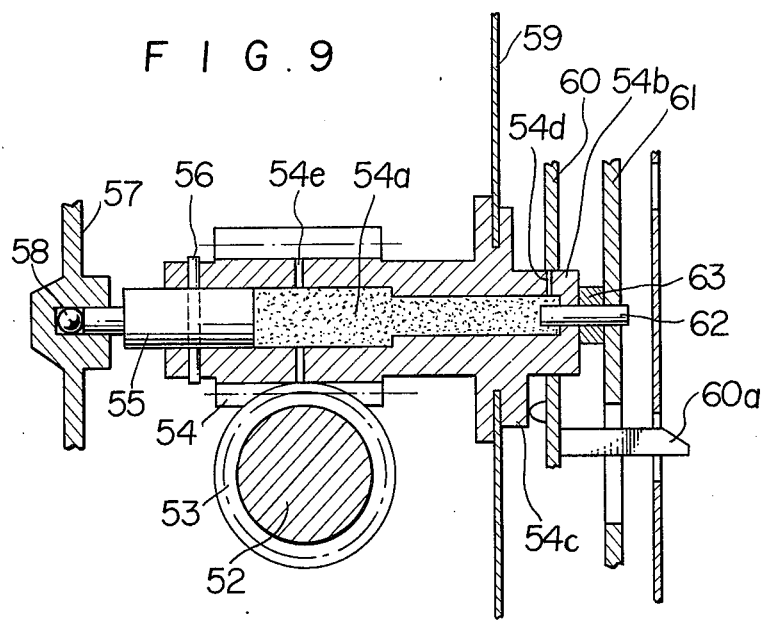
FIG. 9 is a cross section taken along the line I—I and viewed in the direction of arrows.

FIGS. 8 and 9 show a further embodiment of the unit according to the invention as applied to the film feed mechanism of a motion picture camera. A shaft 52 is adapted to driven for rotation by a drive motor 67, and carries a worm gear 53 at its one end meshing with a worm wheel 54 which is centrally formed with a storage 54a in which lubricant, such as grease, having a high viscosity is filled. A shaft 55 is fitted into the storage 54a of the worm wheel 54 and is held in place by a hook pin 56, and is carried by a bearing 47 which includes a thrust bearing ball 58. A shutter blade 59 is fitted around the worm wheel 54 and rotates integrally therewith. A film feed member 60 includes a film feed pawl 60a and is moved by eccentric cams 54b, 54c formed at one end of the worm wheel. An aperture plate 61 supports a shaft 62 which is fitted into the end of the worm wheel and is spaced therefrom by a spacer 63. A supply hole 54e is formed in the worm wheel 54 for supplying the lubricant contained within the storage 54a to the worm gear 53 which meshes with the worm wheel, and similarly another supply hole 54d is formed therein for supplying such lubricant to the portion which is in sliding contact with the film feed member 60. The shaft 52 carries a gear 64 at its other end, which meshes with a gear 65 fixedly mounted on the shaft 66 of the drive motor 67.

In the arrangement described above, as the worm wheel 54 rotates, the viscosity of the lubricant contained within the storage 54a will be decreased at the positions of the supply holes 54e, 54d as a result of the heat produced by the friction between the engaging parts of the worm wheel 54, worm gear 53 and film feed member 60, and will be supplied to the worm gear 53 and the film member 60 under the influence of the centrifugal force.

From the foregoing, it will be appreciated that the invention has provided a lubrication unit in which a rotating body such as cam is impregnated with a lubricant, the softening of which is accelerated by the frictional heat produced as the rotational speed increases and which will be supplied to the outer periphery of the rotating body which is in sliding contact with a feed pawl or other slave member, at a rate commensurate with the increasing centrifugal force. It will be appreciated that the application of the lubrication unit according to the invention is not limited to a motion picture camera or motion picture projector described above, but can equally be applied to a mchanism involving a high speed rotating body which it is difficult to lubricate externally. By way of example, the invention can be applied to a high speed motor drive mechanism in a still camera.

While in a small size motion picture camera or projector of the prior art construction, it has been difficult to operate such device continuously at a high speed because of the lubrication requirement, the lubrication unit of the invention can advantageously be used in such applications to provide a satisfactory lubrication without requiring additional space. Because the amount of lubricant supplied is automatically controlled in accordance with the rotating speed of the rotating body, the unit assures the supply of an adequate amount of a lubricant. Such automatic supplying action can advantageously be applied to a cam mechanism which rotates continuously at a high speed.

What is claimed is:

1. A power transmission apparatus for use in a motion picture camera, a motion picture projector or the like which is actuated by a driving force and includes a driving mechanism for supplying the driving force, and a plurality of interengageable driving gears arranged to be driven by said driving mechanism, wherein the improvement comprises that the plurality of said driving gears includes at least one of said gears having a reservoir formed therein and arranged to contain a lubricant, a guide passage formed in said gear containing said lubricant reservoir with said guide passage extending between said reservoir and the bottom surface of said gear between adjacent teeth thereon, a grease-like lubricant within said reservoir which has a variable viscosity when exposed to the influence of frictional heat developed when the plurality of driving gears are engaged with one another with the lubricant being supplied from said reservoir of said gear through said guide passage by virtue of the centrifugal force generated by the rotational motion of said gear containing said reservoir, and the viscosity of said lubricant is also variable in accordance with the speed of revolution of said gear containing said reservoir when it is in rotational motion and said lubricant being supplied from said reservoir in said gear in accordance with the speed of revolution of said gear by virtue of the centrigugal force developed as it rotates, said lubricant reservoir is located eccentrically to the axis of revolution of said gear, and a body of felt positioned within said reservoir and impregnated with said grease-like lubricant.

2. A film feed apparatus for use in a motion picture camera, a motion picture projector or the like, comprising an image forming optical system, a means for feeding film to a predetermined position including a film feeding member, a means for driving said film feeding means to provide the film feeding action, said film driving means comprises a rotatable shaft, a cam means including at least one cam member connected to said rotary shaft to be rotatable therewith and said cam member being slidably connected with said film feeding member for controlling said film feeding means, a lubricant reservoir disposed within said cam member, a lubricant guide passage formed in said cam member and communicating between said lubricant reservoir and the surface of said cam member which is in slidable contact with said film feeding member, a grease-like lubricant stored within said lubricant reservoir and having a viscosity variable under the influence of frictional heat generated by the contact of said cam member with said film feeding member and arranged to be supplied through said lubricant guide passage due to the centrifugal force generated by the rotational motion of said cam member, and a means for preventing said lubricant from being scattered with said means disposed between said cam member and the film and also between said cam member and said image forming optical system for preventing said grease-like lubricant from scattering onto the film and said image forming optical system, and due to the rotational motion of said rotary shaft on which said cam member is mounted, the viscosity of said lubricant within the reservoir in said cam member is variable in accordance with the revolving speed of said rotary shaft and said lubricant is fed from said reservoir through said guide passage in accordance with the revolving speed of said rotary shaft, said film driving means includes a drive source, a plurality of interengaged gears arranged to be driven by said drive source and to rotate with said rotary shaft, the plurality of said gears including at least one gear having a lubricant reservoir therein and a lubricant guide passage formed therein extending between said reservoir and an opening from said guide passage to the bottom surface between adjacent teeth on said gear, a grease-like lubricant within said lubricant reservoir having a variable viscosity under the influence of frictional heat generated by the interengagement of said gears with one another and said lubricant being displaced from said reservoir through said guide passage under the influence of the centrifugal force generated by the rotational motion of said gear containing said reservoir, said lubricant reservoir rotated within said gear being eccentric to the center of revolution of said gear, said cam means includes a circular cylindrical member disposed transversely of said rotary shaft, and said circular cylindrical member being located eccentric to the center of rotation of said rotary shaft, said cam member comprises a triangular member disposed transversely of said rotary shaft, and a plurality of spaced said lubricant guide passages are formed in said cam member and are in the form of open grooves extending across the surface of said cam member out of contact with said film feeding member and extending transversely of the surfaces of said cam member which are in contacting relationship with said film feeding member.

3. A film feed apparatus for use in a motion picture camera, a motion picture projector or the like, comprising a means for feeding film to a predetermined position, said film feeding means including a film feeding member, a means for driving said film feeding means comprising a motor generating a driving force, a means in operative connection with said motor for transmitting the driving force from said motor and including a plurality of intermeshed gears, the plurality of said gears including at least one said gear having a first lubricant reservoir therein and guide passage extending between said lubricant reservoir and the bottom surface between adjacent teeth on the one said gear, a rotary shaft driven by said motor through said means for transmitting driving force, a cam means disposed on said rotary shaft and arranged in slidable contact with said film feeding member for substantially controlling said film feeding member, said cam means including a cam member, a second lubricant reservoir located within said cam member and lubricant guide passages provided in said cam member extending between said second lubricant reservoir and the surface of said cam member in slidable contact with said film feeding member, a grease-like lubricant stored in both said first and second lubricant reservoirs and having a viscosity variable under the influence of frictional heat generated by the contact of said interengaged gears and by the frictional heat generated by the slidable contact of said cam member with said film feeding member and said lubricant being displaced from said first and second reservoirs through said lubricant guide passages due to the centrifugal force generated by the rotational motion of said gear and said cam member, and the viscosity of said grease-like lubricant in said first and second reservoirs being variable in accordance with the speed of revolution of both of said gear and said cam member and said grease-like lubricant being supplied from said reservoirs through said guide passages in accordance with the centrifugal speed generated by said gear and said cam member within which said reservoirs are located, the centers of each of said first and second lubricant reservoirs being located eccentrically to the centers of said gears and said cam member, respectively, said cam member being formed in the shape of an approximately triangular pole disposed transversely of said rotary shaft, said lubricant guide passages in said cam member being in the form of grooves extending across the surface of said cam member disposed transversely of the surfaces thereof in contact with said film feed member, and said cam means includes a circular cylinder disposed transversely of said rotary shaft.

4. A film feed apparatus for a motion picture camera, a motion picture projector, or the like, comprising image forming optical system, a driving means for actuating said system, said driving means comprising a motor for generating the driving force, a power transmitting means for relaying the driving force from said motor, said power transmitting means being provided with a plurality of toothed wheels arranged to be interengaged with one another and at least one of said tooth wheels being formed with a first lubricant reservoir positioned radially inwardly from the tooth surface thereof and arranged for storing a grease-like lubricant, said tooth wheel containing said first lubricant reservoir having a lubricant guide groove therein extending between said first lubricant reservoir and the dedendum of the toothed surface of said wheel, a rotary shaft rotable by the action of the driving force of said motor through said power transmitting means, shutter blades disposed on said rotary shaft and arranged between said optical system and film surface, said shutter blades being rotatable in cooperation with said rotary shaft for selectively controlling scene brightness emitted from said optical system to be incident upon the film surface, cam means disposed on said rotary shaft and arranged between said shutter blades and said optical system, said cam means having at least a first cam and a second cam which are rotatable in cooperation with said rotary shaft, said first cam being provided on the plane extending from the axial plane extending from the axial plane of said rotary shaft and formed in an approximately triangular shape in transverse section and having a second lubricant reservoir located therein radially inwardly from the cam surfaces thereon, said second cam being located on the side of said first cam closer to said optical system and located in a plane nearly perpendicular to the surface of said first cam, said second lubricant reservoir having a lubricant guide groove opening to the surface of said first cam at the vertex of the triangular shape thereof, a film feeding means for feeding film intermittently to a predetermined position, said means being arranged between said shutter blades and said optical system, and said film feeding means including a shaft supporting member arranged to be nearly parallel with the running direction of the film, a film feeding member hooked up at one side thereof with said shaft supporting member and pressed against a portion of each of said first and second cams, said film feeding member being displaceable in rocking motion in the direction nearly orthogonal to the film surface about the fulcrum at the hook-up portion with said shaft supporting member and also being displaceable in sliding motion in the running direction of the film and including an opening loosely engaged with said first cam so as to transmit the action of said first cam to said film feeding member for controlling the sliding displacement of said member, a projecting portion formed on the plane oppositely facing said second cam surface, said projecting portion being arranged to transmit the path of movement of said second cam to said film feeding member for controlling the rocking displacement of said member, and a film feeding cloth selectively engageable with preforations in the film by virtue of the rocking displacement of said film feeding member, a grease-like lubricant stored within said first and second lubricant reservoirs and arranged to change its viscosity by virtue of the frictional heat provided at the engagement of the plurality of said tooth wheels with one another with the frictional heat of said film feeding member and said first cam hooked up with one another at the opening of said film feeding member, and is arranged to flow from the reservoir through said lubricant guide groove under the influence of the centrifugal force developed by the rotational movement of said toothed wheels as well as the rotational movement of said first cam for lubricating said toothed wheels and affording lubrication from said first cam to the opening of said film feeding member, and a means for preventing lubricant from being scattered positioned between said cam means and said image forming optical system for preventing the lubricant from scattering on to the film and the image forming optical system.

* * * * *